US005617642A

United States Patent [19]

Marios

[11] Patent Number: 5,617,642

[45] Date of Patent: Apr. 8, 1997

[54] TILE FITTING METHOD AND DEVICE

[76] Inventor: Ioannis E. Marios, 8201 Adenlee Ave., Fairfax, Va. 22031

[21] Appl. No.: 414,169

[22] Filed: Jul. 24, 1995

[51] Int. Cl.[6] ................................ G01B 5/24; B43L 7/10

[52] U.S. Cl. ................................ 33/526; 33/452; 33/527

[58] Field of Search ............................ 33/526, 452, 455, 33/456, 518, 527, 533, 645, 646, 647, 648, 649, 551, 552, 561.1, 561.2, 561.3

[56] References Cited

U.S. PATENT DOCUMENTS

| | | | |
|---|---|---|---|
| D. 136,978 | 1/1944 | Tomasini | 33/561.1 |
| 1,129,081 | 2/1915 | Edmonds | 33/456 |
| 1,298,995 | 4/1919 | Michalovitz | 33/464 |
| 2,770,043 | 11/1956 | Kwiecinski | 33/452 |
| 5,410,816 | 5/1995 | Ruggiero | 33/464 |
| 5,471,758 | 12/1995 | White, Sr. | 33/527 |

FOREIGN PATENT DOCUMENTS

| | | | |
|---|---|---|---|
| 32387 | 7/1885 | Germany | 33/456 |
| 1961169 | 8/1970 | Germany | 33/527 |
| 2185115 | 7/1987 | United Kingdom | 33/527 |

*Primary Examiner*—Christopher W. Fulton
*Attorney, Agent, or Firm*—Leydig, Voit & Mayer

[57] ABSTRACT

Disclosed is a method and device for fitting tile and other building material into a mosaic pattern. A base section is connected to a slidable and rotatable rod connected to one or more cut line adjustment rods which conform to a particular pattern for cutting the tile. The base section is mounted flush with an edge and the rods are positioned to conform to an obstruction or other cut out to be cut into the tile. The adjustment rods are then fixed in place, the device is laid over a tile, and the cut lines are made on the tile by tracing the cut line pattern from the device. The tile is cut along the cut line pattern and fitted into the mosaic pattern.

20 Claims, 3 Drawing Sheets

TILE FITTING METHOD AND DEVICE

BACKGROUND OF THE INVENTION

In the laying of tile, brick, marble, and other building material to form a load bearing and/or aesthetically pleasing mosaic pattern or surface, care must be taken that the pieces forming the surface fit together properly. This may require precision fitting of the pieces which can only be accomplished by taking accurate, on-site measurements and cutting individual pieces as required. For example, in laying tile over a subflooring, individual tiles must be cut to conform to adjacent wall surfaces and to bypass obstructions. This involves taking measurements of the subflooring to be covered by the tile, transferring the measurements to the tile by drawing cut lines on the tile, and then cutting the tile along the cut lines. This procedure is very time consuming and is subject to measurement errors, since two numerical measurements must be taken, i.e., first on the subflooring and then on the tile itself, each of which can be a source of error.

Another source of error results from the need to compensate for a grout line. Tile pieces are often not joined flush with each other but are separated by a layer of grout which serves to seal and adhere the tile pieces together. In cutting the tile pieces, the width of the grout line must be taken into account. If not accurately measured, the grout line between the tiles may vary, leading to an unascetic appearance and possibly weakening the tile-to-tile adhesive bond. Compensating for a grout line in a tile piece which also requires complex cutouts can be difficult, since the cutouts are "shifted" by the width of the grout line on one or more sides of the tile.

Because of the complexity and error in making cut line measurements, often only rough measurements are made (either mental or actual) and then the tile is cut to its final shape by trial and error. This method is also time consuming, however, and may result in wasted tile pieces.

There is accordingly a need in the art for a method for quickly and accurately measuring cut lines in tile, brick, marble and other building materials which form a mosaic pattern.

SUMMARY OF THE INVENTION

It is accordingly an aspect of the invention to provide a method and device for providing accurate cut lines on tile, brick, marble, and other building materials.

It is another aspect of the invention to provide accurate cut lines, as above, while eliminating the need for numerical measurements.

It is yet another aspect of the invention to provide accurate cut lines, as above, which can compensate for a grout line.

It is still another aspect of the invention to provide accurate cut lines, as above, which can be used to make cutouts around obstructions.

These aspects of the invention, and others set forth in detail below, are achieved by a device for providing a cut line pattern in a mosaic element which comprises a base section having at least one side adapted for flush alignment with an edge, at least one extension rod secured to the base section, at least one cut line adjustment rod connected to the extension rod and conformable to a predetermined cut line pattern, and a means for releasably fixing the cut line adjustment rod in the predetermined cut line pattern.

The above aspects of the invention are also achieved by a method for providing a cut line pattern in a mosaic element using the above-described device which comprises aligning the base section with an edge, orienting the extension rod toward an area to be covered by a mosaic element, arranging the cut line adjustment rod to a predetermined cut line pattern, releasably fixing in place the extension,rod and the cut line adjustment rod, positioning a mosaic element relative to the base section, placing the device over the mosaic element and positioning the mosaic element relative to the base section to align the cut line pattern in a manner corresponding to the orientation over the area to be covered, and transferring the cut line pattern from the cut line adjustment rod to the mosaic element.

BRIEF DESCRIPTION OF THE DRAWINGS

For a full understanding of the invention, the following detailed description should be read in conjunction with the drawings wherein.

DETAILED DESCRIPTION OF THE PREFERRED EMBODIMENTS

As defined herein, the term mosaic refers to a collection of individual pieces of tile, brick, marble, or other building material forming a decorative design or repetitive pattern. Examples of mosaic include a tiled wall or floor surface, a brick or stone facade or load-bearing wall, and roofing tiles. A mosaic element is a single tile piece, marble piece, stone piece, or brick. A cut line is a marking on a mosaic element indicating where a cut shall be made. A cutout is that portion of a mosaic element removed by cutting.

Figure 1:
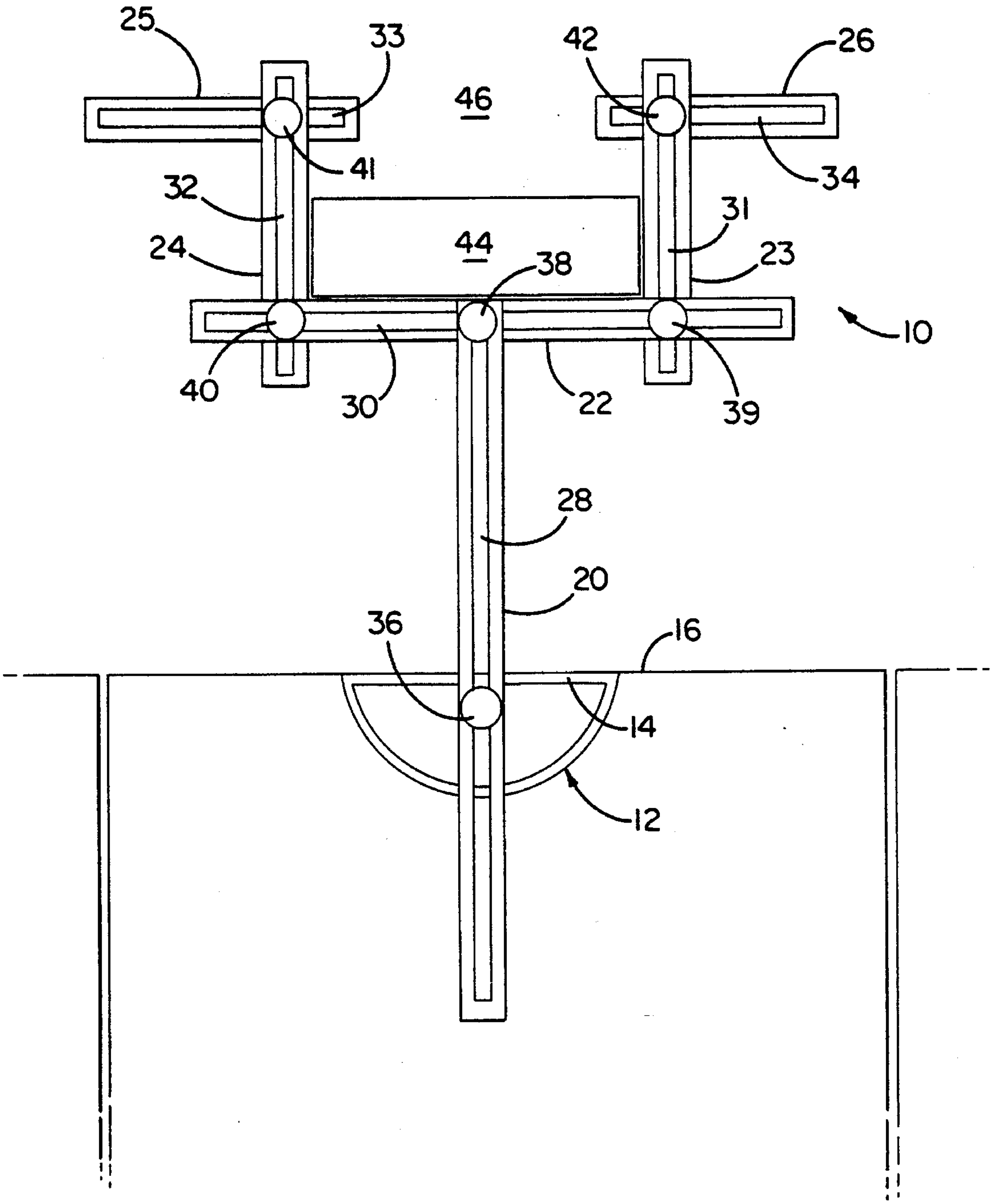
FIG. 1 is a plan view of one embodiment of the device of the invention incorporating a plurality of cut line adjustment rods.

With reference now to the figures, FIG. 1 illustrates a first embodiment of the invention in which a device for providing a cut line in a mosaic element is indicated generally by the number 10. A base section 12 has an alignment surface 14 adapted for flush alignment with an edge 16. The edge 16 can be, inter alia, the edge of a mosaic element already placed in the mosaic, or the edge can be a floor, wall, or roof edge. As illustrated in FIG. 1, the edge 16 is that of a tile 18 secured in place on a subflooring. It is to be understood, however, that in this embodiment as well as in those described below, other mosaic elements can be substituted.

Secured to the base section 12 is an extension rod 20 which is slidably and rotatably engaged with the base section 12 and with one of cut line adjustment rods 22, 23, 24, 25, or 26. The extension rod 20 and cut line adjustment rods 22, 23, 24, 25, and 26 have slots 28, 30, 31, 32, 33, and 34, respectively, along their axial lengths. Positioned within the slots are respective set screws 36, 38, 39, 40, 41, and 42 which, when loosened, allow the extension rod and the cut line adjustment rods to slide along the lengths of their respective slots as well as to rotate freely about axes defined by the set screws. The set screws may be tightened by threadable engagement with a wing nut or equivalent releasable securement means. In this manner, the extension rod and the cut line adjustment rods can be freely manipulated and then fixed in place.

In FIG. 1, an obstruction 44 extends into a subflooring 46. The obstruction can be, for example, a fixture opening such as commonly found in a bathroom, a column footing, a wall, or the like. The cut line adjustment rods are positioned to abut the obstruction with the extension rod 20 being positioned by sliding it along its longitudinal axis and/or by moving the base section 12 along the edge 16. Once the device is positioned, all of the set screws 36, 38, 39, 40, 41, and 42 are tightened so that the extension rod 20 and the cut line adjustment rods 22, 23, 24, 25, and 26 are no longer movable. The device may now be removed from the subflooring 46 and placed over a tile to be cut (not shown).

The device and the tile to be cut are oriented in a manner corresponding to that used when measuring the subflooring 46. This may include aligning the alignment surface 14 with an edge of the tile to be cut. Alternatively, an alignment surface 48 of the base section 12 may be aligned with the tile provided that the device is shifted to compensate for the distance between alignment surfaces 14 and 48. This would involve moving the extension rod forward and, depending on the orientation of the device during the initial measurement of the subflooring, may involve repositioning the base plate along the tile edge. One skilled in the art can readily make the appropriate adjustments.

The tile is then marked along its surface with the pattern formed by the cut line adjustment rods corresponding to the external dimensions of the obstruction 44 using an appropriate marking device, such as a pencil, grease pen, etc. The tile is then fitted over the subflooring 46 in well known manner.

This process is repeated for different tile pieces, in each instance the set screws first being loosened to allow the extension rod and cut line adjustment rods to conform to a new cut line pattern and then retightened to allow transfer of the pattern to the tile to be cut.

Figure 2:
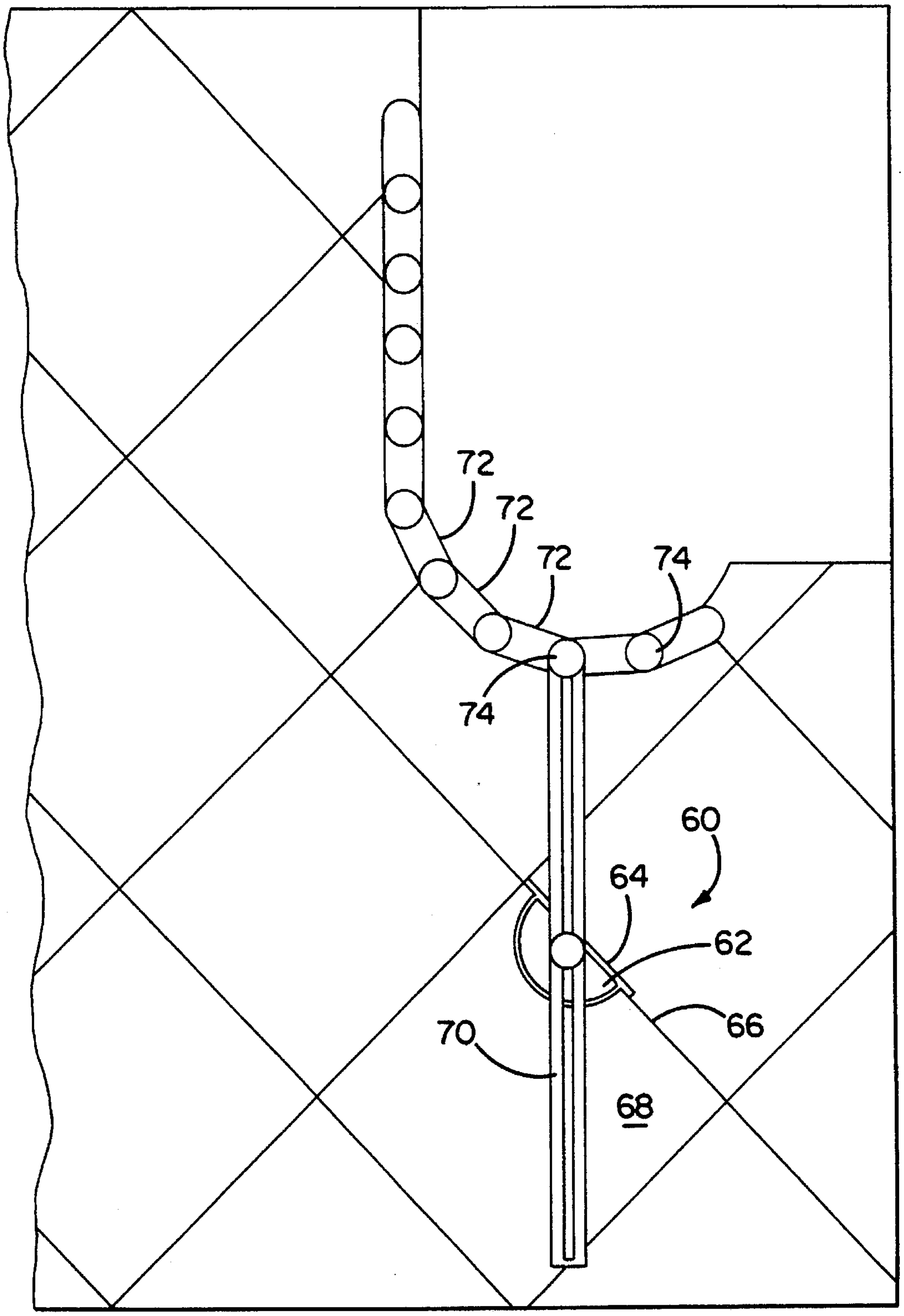
FIG. 2 is a second embodiment of the device incorporating a plurality of cut line adjustment rods connected in series.

FIG. 2 illustrates a second embodiment of the invention wherein a device for providing a cut line pattern is indicated generally by the number 60. Base section 62 having an alignment surface 64 is similar to that shown in FIG. 1. Likewise, edge 66, tile 68, and extension rod 70 correspond to similar elements in FIG. 1.

The embodiment of FIG. 2 differs from that of FIG. 1 in the arrangement of the cut line adjustment rods. In FIG. 2, all of the cut line adjustment rods 72 are similar to each other in shape and size and are connected in series via set screws 74. It is also contemplated that the rods 72 can have different lengths.

When the set screws 74 are in a loosened state, the cut line adjustment rods function much like the links in a bicycle chain and are free to pivot about an axis defined by the set screws to allow a variety of cut line configurations. The rods 72 can be manipulated to a shape which abuts against an obstruction as described earlier in connection with FIG. 1. Once the desired configuration is achieved, the set screws 74 are tightened, locking the rods 72 in place. The tile or other mosaic element is then marked and cut as described above.

While the embodiment shown in FIG. 2 has a higher number of cut line adjustment rods 72 on one side, it will be appreciated that this number can be varied. For example, the number of cut line adjustment rods 72 on either side of the extension rod 70 can be equal, or the cut line adjustment rods can extend on only one side of the extension rod 70. The particular orientation of the rods 72 can be altered to suit a particular application. For example, the extension rod 70 can be affixed to the set screws of any one of the rods 72 by providing the appropriate threaded engagement or equivalent means in the rod 70.

The embodiments of FIGS. 1 and 2 are merely two examples of cut line adjustment rods suitable for use in the invention. Other arrangements for transferring a cut line pattern to a mosaic element can also be used. For example, the cut line rod or rods can also be formed of single or multiple wires. Suitable wires may be heavy gauge copper, aluminum, or other metal or a deformable plastic, provided that the metal or plastic has the ability to readily conform to and retain a shape corresponding to a cut line pattern. The wires may be attached to an extension rod by adhesive, screws, welding, or equivalent means and can be, in the case of metal wires, bare or plastic coated.

As noted earlier, a complicating factor in fitting tile and other mosaic elements is the need to compensate for a grout line. In the present invention, this need can be met by a base section which comprises first and second base plates in slidable engagement with each other. The use of first and second base plates also simplifies alignment of the base section when a different side is used for measurement of the cut line pattern and for transferring the pattern to the mosaic element (e.g., sides 14 and 48 in FIG. 1).

With reference to FIGS. 3*a*, 3*b*, 4, and 5, a first base plate is indicated generally by the number 100 and includes a groove 102 extending partially through base plate 100 along one dimension of a top surface 104.

An end 106 of the groove 102 is adjacent to an alignment surface 108 of the base plate 100. Another end 110 of groove 102 is adjacent to a rear side 112 of base plate 100. A set screw 114 or equivalent device is positioned in rear side 112 and may be adjusted to extend into groove 102. The base plate 100 also includes an alignment surface 116 spaced from alignment surface 108.

Figure 5:
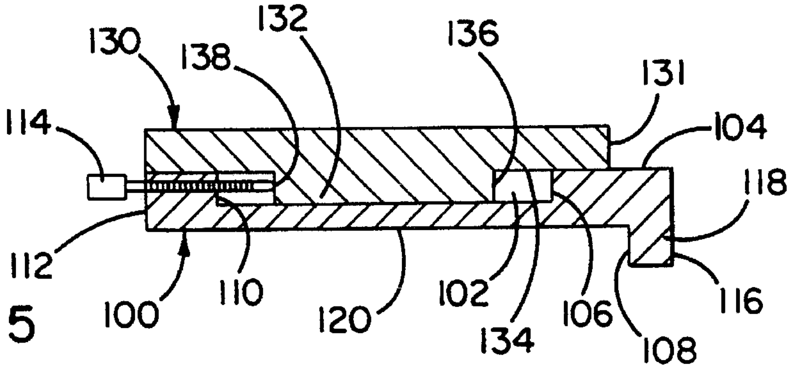
FIG. 5 is a cut away side view of the first and second base plates in an offset position.

As seen more clearly in FIG. 5, the first base plate 100 can include an extension 118 which protrudes downward from the bottom surface 120 of base plate 100. The extension 118 can aid in maintaining alignment surfaces 108 and 116 flush against an edge.

Figure 3A:
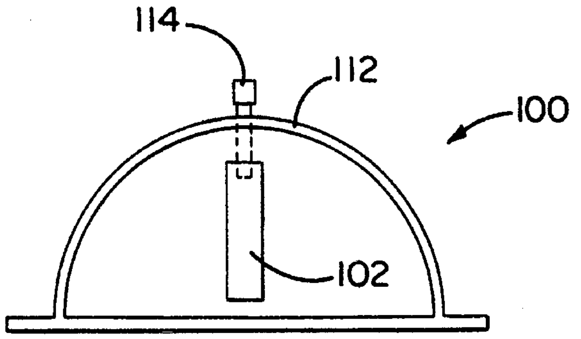
FIG. 3*a* is one embodiment of a first base plate of the tile fitting device.
Figure 3B:
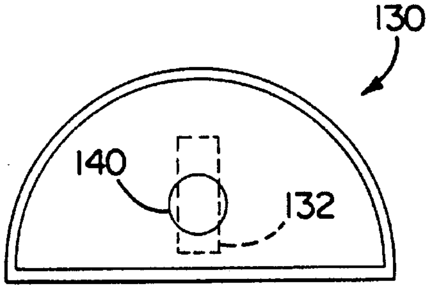
FIG. 3*b* is a second base plate of the same embodiment of FIG. 3*a;*
Figure 4:
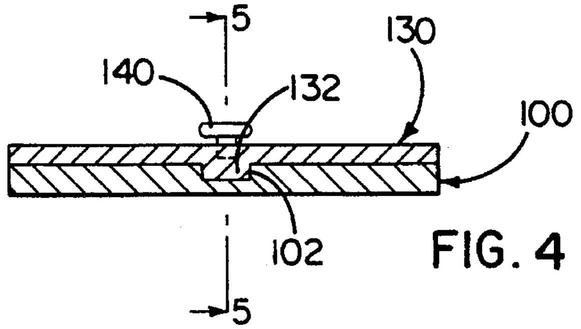
FIG. 4 is a cut away elevational view of the first and second base plates of FIGS. 3*a* and 3*b*.

A second base plate illustrated in FIG. 3*b* is indicated generally by the number 130. The second base plate 130 includes a front side 131 and a tongue 132 which extends partially along one dimension of the bottom surface 134 of the second base plate 130 and includes front end 136 and rear end 138. The tongue 132 engages the groove 102 of the first base plate 100 (see FIGS. 4 and 5) to allow the second base plate 130 to slidably move along a longitudinal axis defined by the tongue 132 and groove 102. A set screw 140 provides for engagement of an extension rod (not shown), as described earlier with respect to FIGS. 1 and 2.

When used to compensate for a grout line, the base section including first and second base plates 100 and 130 may be used as follows. Alignment surface 108 of the first base plate 100 is positioned flush against an edge in a manner similar to that described above. The second base plate 130 is slid forward to an initial position such that front end 136 of tongue 132 abuts end 106 of groove 102. The extension rod and cut line adjustment rod or rods (not shown) are then adjusted and set to conform to a particular cut line pattern, as described earlier. The device is then placed over a tile to be cut with alignment surface 116 of first base plate 100 flush against an edge of the tile. Base plate 130 is then moved to a position such that front side 131 is off-set rearwardly from the initial position by a distance corresponding to the width of the grout line, less the width between alignment surfaces 108 and 116. This offset can be reproducibly maintained by set screw 114 which is adjusted to abut against rear surface 138 of tongue 112 when second base plate 130 is in the offset position. This permits accurately and quickly repeating the process of positioning the second base plate 130 in the offsct position without the need for measuring the width of the offset each time. FIG. 5 illustrates the base plates in the offset position.

The tongue 132 and groove 102 can be in close tolerance which reduces unwanted play in the base plates and aids in making accurate, reproducible grout line measurements. Other arrangements for adjusting the base plates are also possible, however, provided that the grout line offset can be made with reasonable accuracy. For example, in place of a tongue and groove arrangement, the first base plate can be provided with slots which register with pegs extending from the second base plate and a set screw abutting against one of the pegs in the offset position.

The device of the invention can be constructed of any of a number of different materials, such as wood, plastic, metal, etc., the main requirement being that the device is sufficiently rigid to allow the configuration of the extension rod and cut line adjustment rod or rods to retain their position when transferred to a tile or other mosaic material. In a preferred embodiment, the device is constructed of a metal such as steel for durability.

The size of the device can also vary depending on the particular application. One skilled in the art can readily ascertain the proper size for a particular application.

I claim:

1. A device for providing a cut line pattern in a mosaic element comprising:

(a) a base section having at least one side adapted for flush alignment with an edge;

(b) at least one extension rod secured to said base section, said extension rod being slidably and rotatably engaged with the base section along a longitudinal axis thereof and including means for releasable non-sliding and non-rotating securement to the base section at least one of a plurality of positions of said longitudinal axis;

(c) a plurality of cut line adjustment rods connected to said extension rod and conformable to a predetermined cut line pattern, said cut line adjustment rods being slidably and rotatably engaged with each other and to said extension rod and having means for releasable non-sliding and non-rotating securement into said predetermined cut line pattern; and (d) means for releasably fixing said cut line adjustment rods in said predetermined cut line pattern.

2. A device as claimed in claim 1 wherein the base section includes first and second base plates in slidable engagement with each other, the first plate adapted for said flush alignment with said edge and said second base plate engaged to said extension rod.

3. A device as claimed in claim 2 further including means for releasably positioning said second base plate relative to said first base plate.

4. A device as claimed in claim 1, wherein said cut line adjustment rods are rotatably engaged with each other and with said extension rod in series relationship.

5. A device as claimed in claim 4 wherein the base section includes first and second base plates in slidable engagement with each other, the first base plate adapted for said flush alignment with said edge and said second base plate engaged to said extension rod.

6. A device as claimed in claim 5 further including means for releasably positioning said second base plate relative to said first base plate.

7. A device as claimed in claim 4, said cut line adjustment rods extending from one side of said extension rod.

8. A device as claimed in claim 4, said cut line adjustment rods extending from both sides of said extension rod.

9. A device as claimed in claim 1 wherein said plurality of cut line adjustment rods comprises a first adjustment rod slidably and rotatably engaged to one end of said extension rod and second and third cut line adjustment rods slidably and rotatably engaged to said first adjustment rod.

10. A device as claimed in claim 9 further including fourth and fifth cut line adjustment rods secured to said second and third cut line adjustment rods, respectively.

11. A device as claimed in claim 1 wherein said at least one cut line adjustment rod comprises a wire.

12. A method for providing a cut line pattern in a mosaic element comprising:

(a) providing a device comprising a base section having at least one side adapted for flush alignment with an edge, at least one extension rod secured to said base section, and at least one cut line adjustment rod secured to said extension rod;

(b) aligning said base section with an edge;

(c) orienting said extension rod toward an area to be covered by a mosaic element;

(d) arranging said at least one cut line adjustment rod to provide a predetermined non linear cut line pattern to conform the mosaic element to an obstruction extending into said area to be covered;

(e) releasably fixing in place said extension rod and said at least one cut line adjustment rod;

(f) placing the device over the mosaic element and positioning the mosaic element relative to said base section to align said cut line pattern in a manner corresponding to the orientation of step (e); and (g) transferring said cut line pattern from said at least one cut line adjustment rod to said mosaic element.

13. A method as claimed in claim 12 wherein said mosaic element comprises a tile.

14. A method as claimed in claim 12 including cutting said mosaic element along said cut line pattern and positioning said element over said area to be covered.

15. A method as claimed in claim 12 wherein said area to be covered includes a grout line along an edge, wherein said aligning step includes aligning a first base plate of said base section with said edge, and wherein said method includes the step of offsetting a second base plate from an edge of said mosaic element by an amount corresponding to the width of said grout line, said second base plate having said extension rod secured thereto and being slidably engaged with said first base plate and adjusted to reproducibly maintain the relative position with said first base plate.

16. A device for providing a cut line pattern in a mosaic element comprising:

(a) a base section having at least one side adapted for flush alignment with an edge;

(b) at least one extension rod secured to said base section;

(c) at least one cut line adjustment rod connected to said extension rod and conformable to a predetermined cut line pattern; and (d) means for releasably fixing said at least one cut line adjustment rod in said predetermined cut line pattern;

wherein the base section includes first and second base plates in slidable engagement with each other, the first plate adapted for said flush alignment with said edge and said second base plate engaged to said extension rod.

17. A method for providing a cut line pattern in a mosaic element comprising:

(a) providing a device comprising a base section having first and second base plates, said first base plate including at least one side adapted for flush alignment with an edge, at least one extension rod secured to said base section, and at least one cut line adjustment rod secured to said extension rod;

(b) aligning said first base plate with an edge;

(c) orienting said extension rod toward an area to be covered by a mosaic element, said area including a grout line along said edge;

(d) offsetting said second base plate from an edge of said mosaic element by an amount corresponding to the width of the grout line, said second base plate having said extension rod secured thereto and being slidably engaged with said first base plate and adjusted to reproducibly maintain a relative position with said first base plate;

(e) arranging said at least one cut line adjustment rod to provide a predetermined cut line pattern;

(f) releasably fixing in place said extension rod and said at least one cut line adjustment rod;

(g) placing the device over the mosaic element and positioning the mosaic element relative to said base section to align said cut line pattern in a manner corresponding to the orientation of step (f); and (h) transferring said cut line pattern from said at least one cut line adjustment rod to said mosaic element.

18. A method as claimed in claim 17 wherein the step of positioning the mosaic element relative to said base section includes abutting a side of said first base plate with an edge of said mosaic element and wherein said offsetting step includes offsetting a side of said plate from said side of said first base plate by an amount corresponding to said grout line.

19. A method as claimed in claim 18 including cutting said mosaic element along said cut line pattern and positioning said element over said area to be covered.

20. A method as claimed in claim 19 wherein said mosaic element comprises a tile.

* * * * *